US012519817B2

United States Patent
Trabelsi et al.

(10) Patent No.: US 12,519,817 B2
(45) Date of Patent: Jan. 6, 2026

(54) GENERATIVE ARTIFICIAL INTELLIGENCE PENETRATION TESTING AUTOMATION

(71) Applicant: SAP SE, Walldorf (DE)

(72) Inventors: Slim Trabelsi, Biot (FR); Caroline Banchereau, Fayence (FR); Marco Rosa, Biot (FR)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 18/429,355

(22) Filed: Jan. 31, 2024

(65) Prior Publication Data

US 2025/0247416 A1 Jul. 31, 2025

(51) Int. Cl.
*H04L 9/40* (2022.01)
*G06N 3/0455* (2023.01)
*G06N 3/084* (2023.01)

(52) U.S. Cl.
CPC ....... *H04L 63/1433* (2013.01); *G06N 3/0455* (2023.01); *G06N 3/084* (2013.01)

(58) Field of Classification Search
None
See application file for complete search history.

(56) References Cited

U.S. PATENT DOCUMENTS

2020/0336507 A1* 10/2020 Lee ...................... G06F 21/577
2021/0248242 A1* 8/2021 Pathak ................ G06F 11/3692
2024/0378395 A1* 11/2024 Sommers ................ H04L 41/08
2025/0053499 A1* 2/2025 Ayyadurai .......... G06F 11/3698
2025/0147956 A1* 5/2025 Payani .............. G06F 16/24522

OTHER PUBLICATIONS

Deng, Gelei, "PENTESTGPT: An LLM-empowered Automatic Penetration Testing Tool", arXiv:2308.06782v1, (Aug. 13, 2023), 1-17.
Hu, Zhenguo, "Automated Penetration Testing Using Deep Reinforcement Learning", IEEE European Symposium on Security and Privacy Workshops (EuroSandPW), (2020), 1-9.
Pearce, H, "Examining Zero-Shot Vulnerability Repair with Large Language Models", IEEE Symposium on Security and Privacy. arXiv:2112.02125v3, [Online]. Retrieved from the Internet: URL: arXiv:2112.02125v3, (2022), 18 pgs.
Schwartz, Jonathan, "Autonomous Penetration Testing using Reinforcement Learning (thesis)", School of Information Technology and Electrical Engineering, University of Queensland, Australia, (Nov. 16, 2018), 81 pgs.
Tran, Khuong, "Deep hierarchical reinforcement agents for automated penetration testing", IJCAI-21 1st International Workshop on Adaptive Cyber Defense. arXiv:2109.06449v1, (2021), 8 pgs.

* cited by examiner

*Primary Examiner* — Raqiul A Choudhury
(74) *Attorney, Agent, or Firm* — SCHWEGMAN LUNDBERG & WOESSNER, P.A.

(57) ABSTRACT

In an example embodiment, a solution is provided for an automated penetration testing system using pre-trained large language models (LLMs), which come equipped with a knowledge base of existing system configurations and commands. The knowledge base of these pre-trained LLMs may be extended with new training data, thereby updating their knowledge with new configuration commands, systems, and so forth.

20 Claims, 5 Drawing Sheets

GENERATIVE ARTIFICIAL INTELLIGENCE PENETRATION TESTING AUTOMATION

TECHNICAL FIELD

This document generally relates to computer systems. More specifically, this document relates to use of large language models.

BACKGROUND

A large language model (LLM) refers to an artificial intelligence (AI) system that has been trained on an extensive dataset to understand and generate human language. These models are designed to process and comprehend natural language in a way that allows them to answer questions, engage in conversations, generate text, and perform various language-related tasks.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
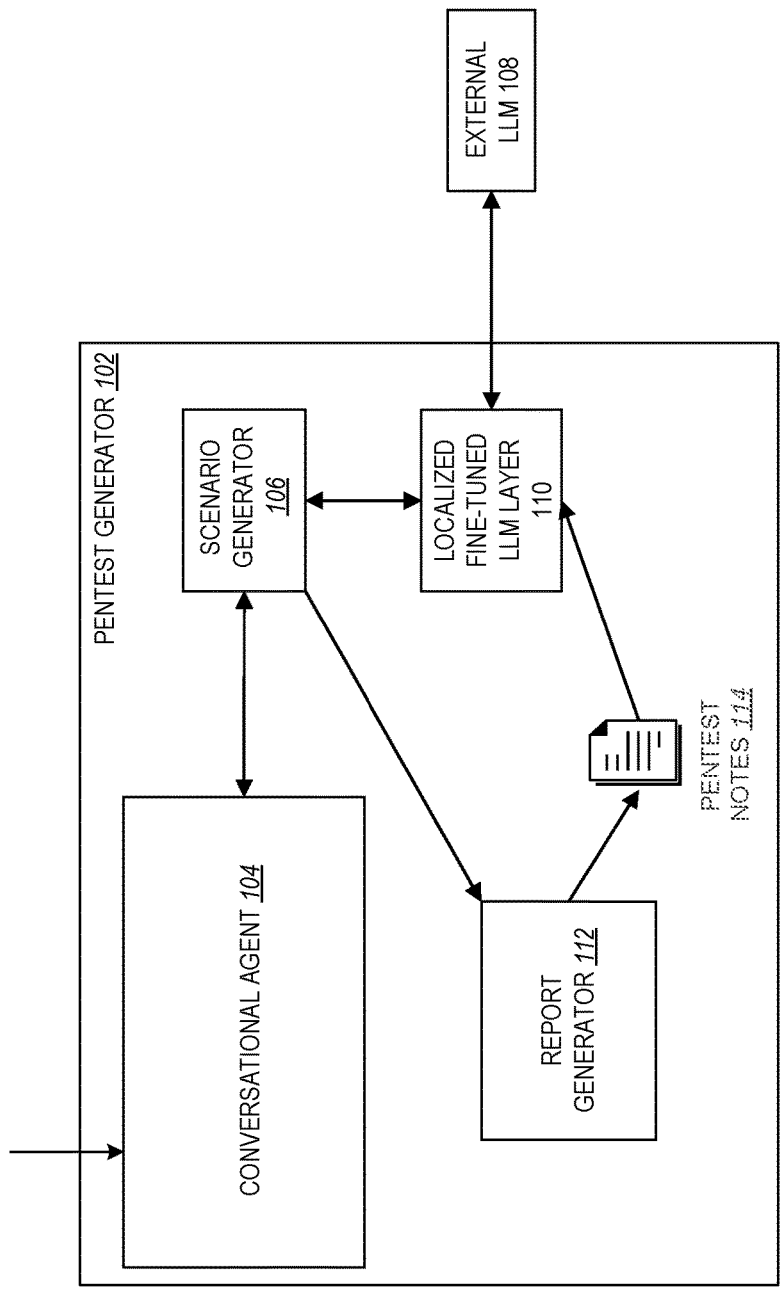
FIG. 1 is a block diagram illustrating a system, in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

Network-based systems and applications are susceptible to attacks by malicious users (e.g., hackers). Penetration testing (also referred to as pentesting) is conducted to attack systems and applications in an effort to find security holes, which can be exploited by malicious users. In general, penetration testing simulates attacks malicious users could attempt. During penetration testing, a series of tasks is performed in an effort to achieve a goal. A task can be performed using a respective tool (e.g., provided as one or more computer-executable programs), a subset of a tool, and/or by the tester writing a custom tool. Consequently, executing a penetration test can include running a set of tools in a specified order and, based on their outcomes, run further testing tools until a goal is reached, or failure occurs.

In pentesting, "pentest notes" serve as informal guidelines that detail the steps and scenarios for penetration tests targeting specific systems, software, technology, or hardware. These notes, authored by penetration testers ('pentesters'), are publicly disseminated for the purpose of testing and refinement by their peers. Distribution typically occurs via recognized open-source platforms, dedicated websites, or through specific discussion forums and private groups.

These pentest notes assume significant importance when they detail a novel penetration test targeting a new system or technology. They typically encompass a sequence of configuration instructions, commands, and tests. Other pentesters may utilize these notes as a foundation for their initial pentest, thereby circumventing the need to start from scratch or repeat methods already documented in the notes. However, the initial versions of these notes often require optimization and are consequently subject to updates and enhancements to improve efficiency.

Therefore, in conducting a new penetration test based on these notes, a pentester may expend considerable time testing and modifying the recommended commands. This process can be especially time-consuming and tedious for novice pentesters.

One solution would be to utilize machine learning to aid in pentesting. Specifically, a machine learning model may be trained to provide guidance to a pentester in performing a pentest. Such solutions, however, fail to actually automate pentesting actions.

The following is an example of a pentest note and scenario:

1. Access the Web Access
   msfconsole
   # Client Access Server (CAS) IIS HTTP Internal IP Disclosure
   msf> use auxiliary/scanner/http/owa_iis_internal_ip
   # Brute Force credentials
   msf> use auxiliary/scanner/http/owa_login
2. Discover common directories
   # Autodiscover service
   /autodiscover/
   /autodiscover/autodiscover.xml
   # Enhanced Client or Proxy
   /ecp/
   # Exchange Web Services
   /ews/
   # Offline Address Books
   /oab/
   # Outlook Web Access
   /owa/
   /owa/auth/login.aspx
3. ProxyShell access
   msfconsole
   msf> use exploit/windows/http/exchange_proxyshell_rce
   msf> (set options . . . )
   msf> exploit
   meterpreter> shell
   In the Set option line the Agent will ask the end user to select an option
   The options are listed here:
   BackendServerName
   Exchange BasePath
   Exchange WritePath
   IISBasePath
   IISWritePath
   MapiClientApp Assuming that the end user decides to select the two first options, the new version of the third step will be the following:

```
msfconsole
msf> use exploit/windows/http/exchange_proxyshell_rce
msf> BackendServerName servername
msf> ExchangeBasePath C: \Program
    Files\\Microsoft\\Exchange
    Server\\V15
msf> exploit
meterpreter> shell
```

In an example embodiment, a solution is provided for an automated penetration testing system using pre-trained large language models (LLMs), which come equipped with a knowledge base of existing system configurations and commands. The knowledge base of these pre-trained LLMs may be extended with new training data, thereby updating their knowledge with new configuration commands, systems, and so forth.

In an example embodiment, the pre-trained LLMs are further trained with new penetration testing notes to enhance their knowledge. The LLMs can then function as a conversational agent for the penetration tester, capable of proposing new penetration testing scenarios for specific systems upon request. The model can generate one or more scenarios corresponding to the requested target system.

The penetration tester is then able to accept or suggest modifications to the process. Once the tester validates the scenario, the agent initiates the automated generation of the necessary configurations and executes the commands related to the tools and Application Programming Interface (API) used to perform the penetration test on the system. The agent is configured to execute commands derived from the LLM's instructions.

The agent can provide feedback after every step of the scenario execution. This feedback may pertain to the success or failure of the command or indicate the need for human interaction. The penetration tester can validate each step and refine some decisions or allow the agent to execute all the steps of the scenario. This system enhances the efficiency of the penetration testing process, reducing the need for human intervention.

For purposes of this document, the term "agent" can also be referred to as a "software assistant", which shall be broadly interpreted as a software program designed to provide assistance for the use of an LLM.

LLMs used to generate information are generally referred to as Generative Artificial Intelligence (GAI) models. A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BILSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero-sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, though a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model.

FIG. 1 is a block diagram illustrating a system 100 for penetration testing, in accordance with an example embodiment. The system includes a pentest generator 102. Included in the pentest generator 102 is a conversational agent 104. The conversational agent interacts with the user. It handles user input and sends output to a scenario generator 106. The pentester begins by identifying contextual information related to a new pentest exercise. This contextual information may include any information that may be useful in creating or modifying the new pentest exercise, including the target (including language, name, components, online vs. offline, cloud vs. local implementation, etc.). The pentester supplies this information to the conversational agent 104, along with a new specific pentest note document. The pentest note document contains all the steps and commands to execute a pentest exercise.

The conversational agent 104 passes the new specific pentest note document along with the context information to the scenario generator 106. The scenario generator will ultimately interact with an LLM to generate a scenario suggestion. This may be accomplished in a few different ways. FIG. 1 depicts a first example embodiment, where an external LLM 108 is supplemented by a localized fine-tuned LLM layer 110. In this embodiment, the scenario generator 106 interacts with the localized fine-tuned LLM layer 110, and the localized fine-tuned LLM layer 110 acts to generate the scenario using the external LLM 108. More particularly, the external LLM 108 is trained to generally utilize input prompts and contextual information to generate text based on generalized training across many different domains and knowledge areas. The localized fine-tuned LLM layer 110 acts as a version of the external LLM 108 that has been retrained to be a special-purpose LLM specifically for the processes relating to generating text for pentesting (or, alternatively, more generally for the domain or entity involved in the pentesting).

The fine tuning may include obtaining an LLM trained generally (here the external LLM 108), and then rerunning a machine learning algorithm that was used to train the general LLM using purpose and environment/specific data. In this case, the training data includes pentest notes and testing results. The machine learning model then retrains the general LLM to produce a special-purpose LLM.

In an example embodiment, the retraining may include the following operations. First the training data is cleaned and preprocessed to remove any irrelevant or sensitive information. It is then split into smaller chunks or sequences that the model can process effectively. The model is fine-tuned using a process called unsupervised learning. The primary objective during training is to predict the next word in a sequence given the previous words. This is done using a technique called "masked language modeling" or "cloze task."

The objective of masked language modeling is to predict missing words in a sentence or sequence of words. During the training process, some words in the input text are randomly masked, and the model is then required to predict the masked words based on the context provided by the surrounding words. To accomplish masked language modeling, three operations are performed: masking, context-based prediction, loss calculation, and finally backpropagation and updating. For masking, in the input text or sequence of words, a certain percentage of words is randomly selected and replaced with a special token. In context-based prediction, the LLM then processes the masked input and uses the context from the surrounding words to predict the masked word. The model considers the relationships between words, the grammar of the language, and the overall semantics to make an informed guess about the masked word.

In loss calculation, the model's prediction for the masked word is compared to the actual word (the original word that was masked) using a loss function, such as cross-entropy loss. The loss function quantifies the difference between the predicted probability distribution over words and the true distribution (one-hot encoded vector representing the actual word). Finally, for backpropagation and update, the loss is backpropagated through the model, and the model's parameters (weights and biases) are updated to minimize the loss and improve the model's ability to predict masked words accurately.

As far as cloze task, this involves the model being presented with a passage of text with certain words or phrases removed, and the model is challenged to fill in the missing words based on the context provided.

Returning now to the retraining process, the model is exposed to the preprocessed data and learns from it iteratively over multiple training iterations. During each iteration, the model adjusts its internal parameters (weights and biases) to minimize the prediction errors and improve its performance. The training process involves optimization algorithms like Stochastic Gradient Descent (SGD) or its variants, which fine-tune the model's parameters to make it better at predicting the next word in a sequence.

Hyperparameter Tuning can then be performed where various hyperparameters (e.g., learning rate, batch size, number of layers) are tuned to find the best configuration that results in optimal performance and generalization.

Once a generated scenario is received by the scenario generator 106, the generated scenario may be presented to the pentester via the conversational agent 104. The conversational agent 104 then can ask if there is any human feedback on the generated scenario. If there is any feedback, then this feedback is sent to the scenario generator 106, which then reruns the generation of the scenario but this time includes the feedback as input as well. In other words, in this example embodiment, the scenario generator 106 sends another request to the localized fine-tuned LLM layer 110 with a prompt that includes the new specific pentest note document along with the context information, and the feedback. A new scenario is then generated and again presented to the pentester via the conversational agent 104. This process repeats until the pentester has no feedback (the pentester validates the proposed scenario).

The conversational agent 104 then asks the pentester if the scenario should be launched step-by-step (with manual validation between each step) or not. If so, then a first step of the scenario is executed, and validation sought about the execution of the step from the pentester. If any step is not validated, which would include the pentester providing feedback about the step, then the scenario generator 106 regenerates the scenario using this new feedback and reruns the last step. Thus, at each step, the process does not proceed to the next step until some version of the current step has been executed without negative feedback from the pentester. Of course, if the pentester elected to not launch the scenario step-by-step, then it can be executed in one iteration all at once.

Once the scenario has been completely executed, the conversational agent 104 can then ask the pentester if any new actions need to be added. If so, then the scenario continues to run with the new actions. If not, then no more action is needed for this pentest scenario. A report generator 112 generates a report based on the execution of the scenario. This may be accomplished by the report generator 112 prompting the localized fine-tuned LLM layer 110 to generate the report. This report is used to create or update pentest notes 114. Notably, these pentest notes 114 may then be fed back into the localized fine-tuned LLM layer 110 to retrain the localized fine-tuned LLM layer 110 based on the pentest notes 114.

Figure 2:
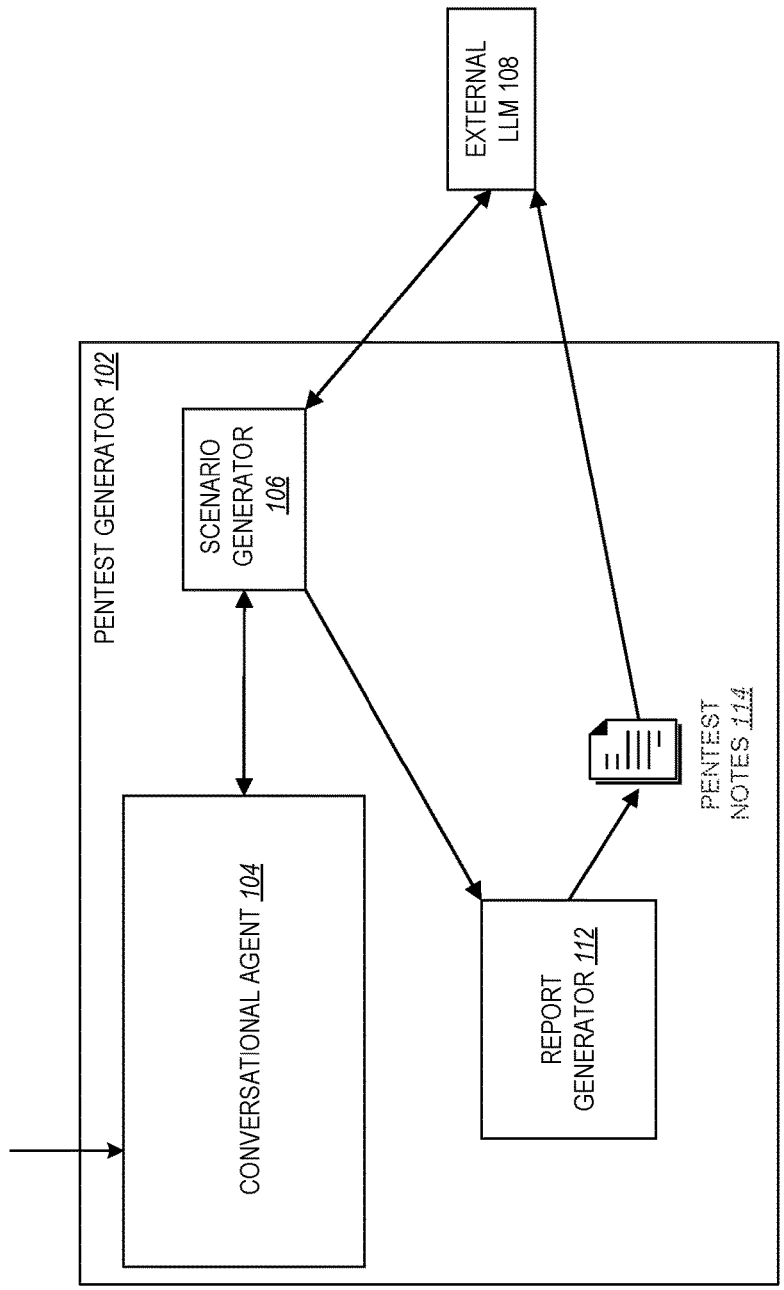
FIG. 2 is a block diagram illustrating a system in accordance with another example embodiment.

FIG. 2 is a block diagram illustrating a system 200 for penetration testing, in accordance with an example embodiment. The system 200 is identical to the system of FIG. 1, except for the lack of a localized fine-tuned LLM layer 110. Here, the scenario generator 106 and/or report generator 112 interacts directly with the external LLM 108. It should also be noted that it is possible for the external LLM 108 to be contained within the pentest generator 102 itself, or at least be managed by the same entity as the pentest generator 102. Such an embodiment is currently not cost-effective given the cost of training and maintaining a full LLM, but it might turn out to be cost-effective in the future and nothing in this disclosure prohibits such an embodiment from being covered by the present disclosure.

Figure 3:
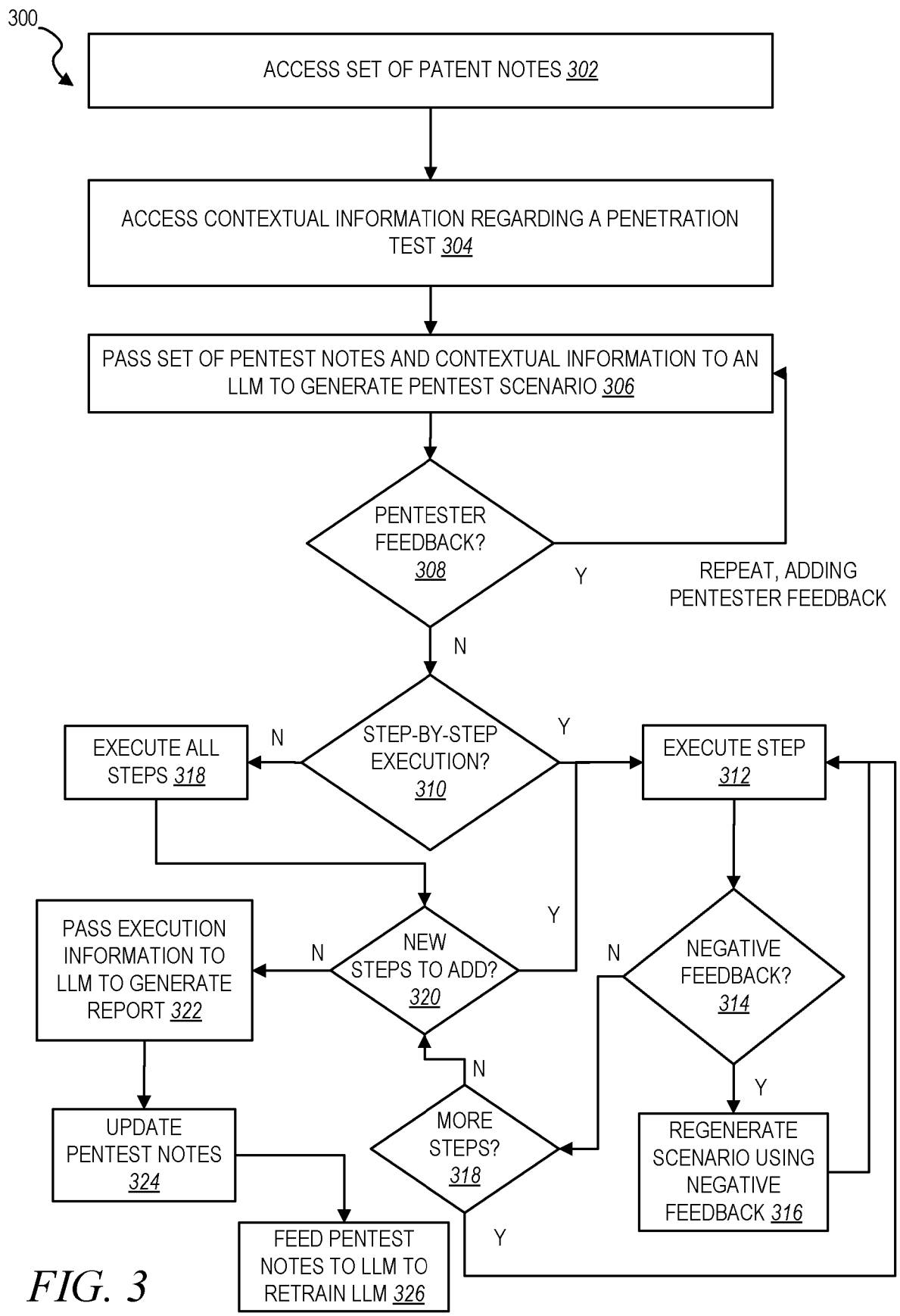
FIG. 3 is a flow diagram illustrating a method for utilizing one or more LLMs, in accordance with an example embodiment.

FIG. 3 is a flow diagram illustrating a method 300 for penetration testing, in accordance with an example embodiment. At operation 302, a set of pentest notes is accessed. This set of pentest notes may be obtained directly from a pentester, although it may ultimately have been obtained from a third-party entity, such as open-source platforms, dedicated websites, or through specific discussion forums and private groups. At operation 304, contextual information regarding a penetration test is accessed. This may also be supplied from a pentester. At operation 306, the set of pentest notes and set of contextual information are passed to an LLM to generate a pentest scenario. This pentest scenario includes a plurality of pentest steps.

At operation 308, it is determined whether there is any feedback from the pentester regarding the generated pentest scenario. If so, then the method 300 loops to operation 306 where another pentest scenario is generated, this time using the feedback as well as the set of pentest notes and set of contextual information.

This repeats until there is no feedback from the pentester regarding the generated pentest scenario. At that point, at operation 310, it is determined whether the pentest scenario should be executed step-by-step with human feedback possible at each step. If so, then at operation 312 the first step is executed. At operation 314 it is determined if there is any negative feedback about the step's execution. If so, then at operation 316 the pentest scenario is regenerated using the negative feedback. If not, then at operation 318 it is determined if there are any more steps in the generated pentest scenario. If so, then the method 300 loops back to operation 312 for the next step.

If at operation 310 it was determined that the pentest scenario should not be executed step-by-step with human feedback possible at each step, then at operation 318 all steps of the pentest scenario are executed.

At operation 320, it is determined whether there are any more steps to be added to the pentest scenario. If so, then the method loops back to operation 306, where another pentest scenario is generated, this time using the information about the additional steps to be added. If not, then at operation 322, execution information about the execution of the steps of the pentest generator are passed to the LLM to generate a report. At operation 324, this report is used to create or update pentest notes. At operation 326, the pentest notes are fed to the LLM to retrain the LLM.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing, by a first software assistant, a set of one or more penetration test (pentest) notes, the pentest notes including one or more guidelines for performing penetration testing; accessing, by the first software assistant, contextual information regarding a target of the penetration testing; feeding, by the first software assistant, the set of one or more pentest notes and the contextual information to a Large Language Model (LLM); receiving, from the LLM, a generated testing scenario, the generated testing scenario including a sequence of steps to be performed to perform the penetration testing on the target; executing the sequence of steps, producing one or more results; feeding, by the first software assistant, the one or more results to the LLM; receiving, from the LLM, a generated report; and updating the pentest notes based on the generated report.

In Example 2, the subject matter of Example 1 includes, wherein the operations further comprise: receiving human feedback regarding the generated testing scenario; and feeding the set of one or more pentest notes, the contextual information, and the human feedback to the LLM to generate an updated version of the generated testing scenario.

In Example 3, the subject matter of Examples 1-2 includes, wherein the operations further comprise: determining whether to execute the sequence of steps one at a time allowing for manual feedback at each step; and in response to a determination to execute the sequence of steps one at a time allowing for manual feedback at each step, executing a first step of the sequence of steps, receiving individual feedback on execution of the first step, and feeding, by the first software assistant, the set of one or more pentest notes, the contextual information, and the individual feedback to the LLM to regenerate the generated testing scenario.

In Example 4, the subject matter of Examples 1-3 includes, wherein the LLM is a localized fine-tuned LLM layer of an external LLM.

In Example 5, the subject matter of Example 4 includes, wherein the localized fine-tuned LLM layer is trained independently of the external LLM.

In Example 6, the subject matter of Examples 1-5 includes, wherein the contextual information includes name of a software component to be tested.

In Example 7, the subject matter of Examples 1-6 includes, wherein the contextual information includes language of a software component to be tested.

Example 8 is a method comprising: accessing, by a first software assistant, a set of one or more penetration test (pentest) notes, the pentest notes including one or more guidelines for performing penetration testing; accessing, by the first software assistant, contextual information regarding a target of the penetration testing; feeding, by the first software assistant, the set of one or more pentest notes and the contextual information to a Large Language Model (LLM); receiving, from the LLM, a generated testing scenario, the generated testing scenario including a sequence of steps to be performed to perform the penetration testing on the target; executing the sequence of steps, producing one or more results; feeding, by the first software assistant, the one or more results to the LLM; receiving, from the LLM, a generated report; and updating the pentest notes based on the generated report.

In Example 9, the subject matter of Example 8 includes, receiving human feedback regarding the generated testing scenario; and feeding the set of one or more pentest notes, the contextual information, and the human feedback to the LLM to generate an updated version of the generated testing scenario.

In Example 10, the subject matter of Examples 8-9 includes, determining whether to execute the sequence of steps one at a time allowing for manual feedback at each step; and in response to a determination to execute the sequence of steps one at a time allowing for manual feedback at each step, executing a first step of the sequence of steps, receiving individual feedback on execution of the first step, and feeding, by the first software assistant, the set of one or more pentest notes, the contextual information, and the individual feedback to the LLM to regenerate the generated testing scenario.

In Example 11, the subject matter of Examples 8-10 includes, wherein the LLM is a localized fine-tuned LLM layer of an external LLM.

In Example 12, the subject matter of Example 11 includes, wherein the localized fine-tuned LLM layer is trained independently of the external LLM.

In Example 13, the subject matter of Examples 8-12 includes, wherein the contextual information includes name of a software component to be tested.

In Example 14, the subject matter of Examples 8-13 includes, wherein the contextual information includes language of a software component to be tested.

Example 15 is a non-transitory machine-readable medium storing instructions which, when executed by one or more processors, cause the one or more processors to perform operations comprising: accessing, by a first software assistant, a set of one or more penetration test (pentest) notes, the pentest notes including one or more guidelines for performing penetration testing; accessing, by the first software assistant, contextual information regarding a target of the penetration testing; feeding, by the first software assistant, the set of one or more pentest notes and the contextual information to a Large Language Model (LLM); receiving, from the LLM, a generated testing scenario, the generated testing scenario including a sequence of steps to be performed to perform the penetration testing on the target; executing the sequence of steps, producing one or more results; feeding, by the first software assistant, the one or more results to the LLM; receiving, from the LLM, a generated report; and updating the pentest notes based on the generated report.

In Example 16, the subject matter of Example 15 includes, wherein the operations further comprise: receiving human feedback regarding the generated testing scenario; and feeding the set of one or more pentest notes, the contextual information, and the human feedback to the LLM to generate an updated version of the generated testing scenario.

In Example 17, the subject matter of Examples 15-16 includes, wherein the operations further comprise: determining whether to execute the sequence of steps one at a time allowing for manual feedback at each step; and in response to a determination to execute the sequence of steps one at a time allowing for manual feedback at each step, executing a first step of the sequence of steps, receiving individual feedback on execution of the first step, and feeding, by the first software assistant, the set of one or more pentest notes, the contextual information, and the individual feedback to the LLM to regenerate the generated testing scenario.

In Example 18, the subject matter of Examples 15-17 includes, wherein the LLM is a localized fine-tuned LLM layer of an external LLM.

In Example 19, the subject matter of Example 18 includes, wherein the localized fine-tuned LLM layer is trained independently of the external LLM.

In Example 20, the subject matter of Examples 15-19 includes, wherein the contextual information includes name of a software component to be tested.

Example 21 is at least one machine-readable medium including instructions that, when executed by processing circuitry, cause the processing circuitry to perform operations to implement of any of Examples 1-20.

Example 22 is an apparatus comprising means to implement any of Examples 1-20.

Example 23 is a system to implement any of Examples 1-20.

Example 24 is a method to implementany of Examples 1-20.

Figure 4:
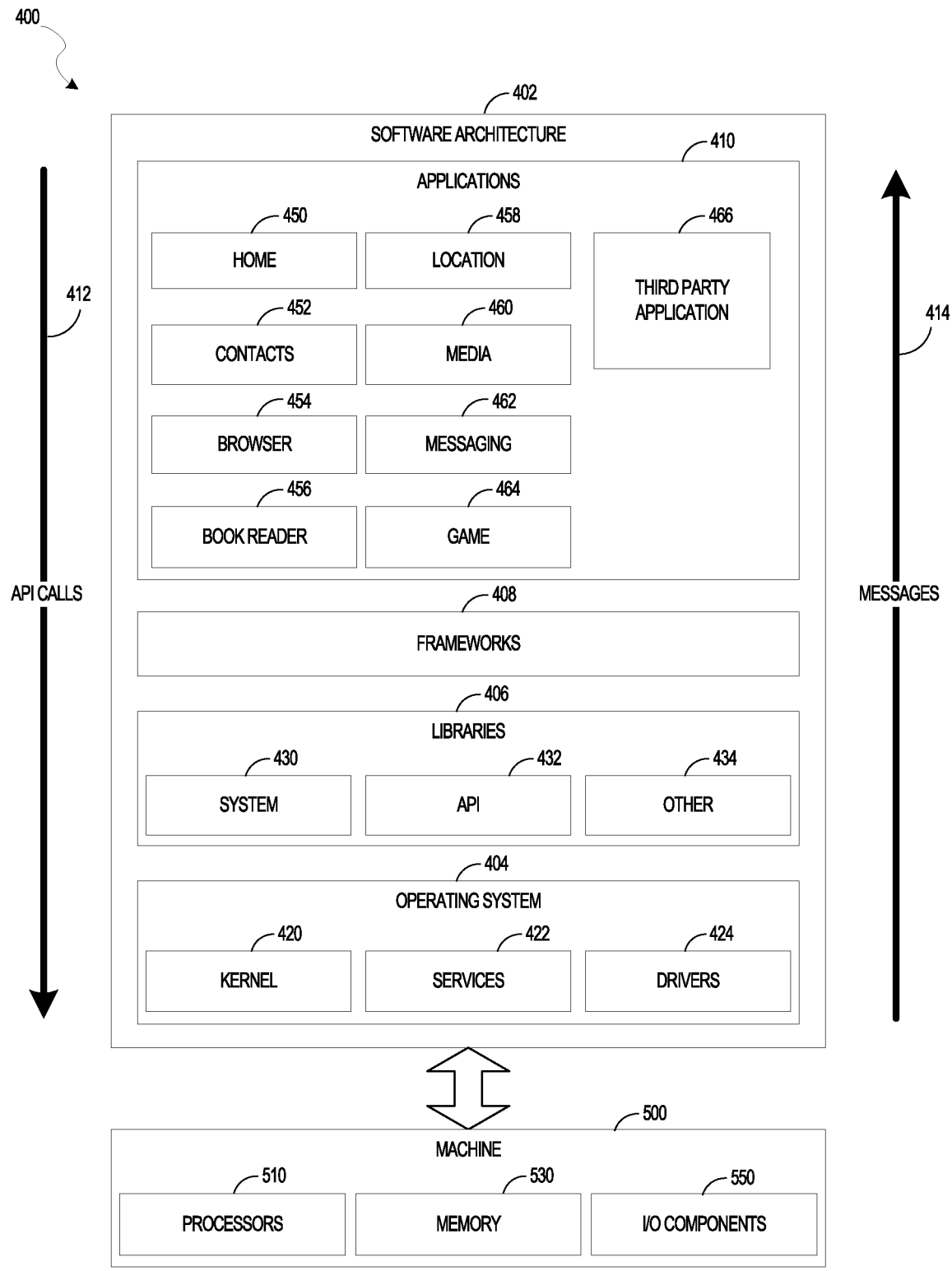
FIG. 4 is a block diagram illustrating an architecture of software, which can be installed on any one or more of the devices described above.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
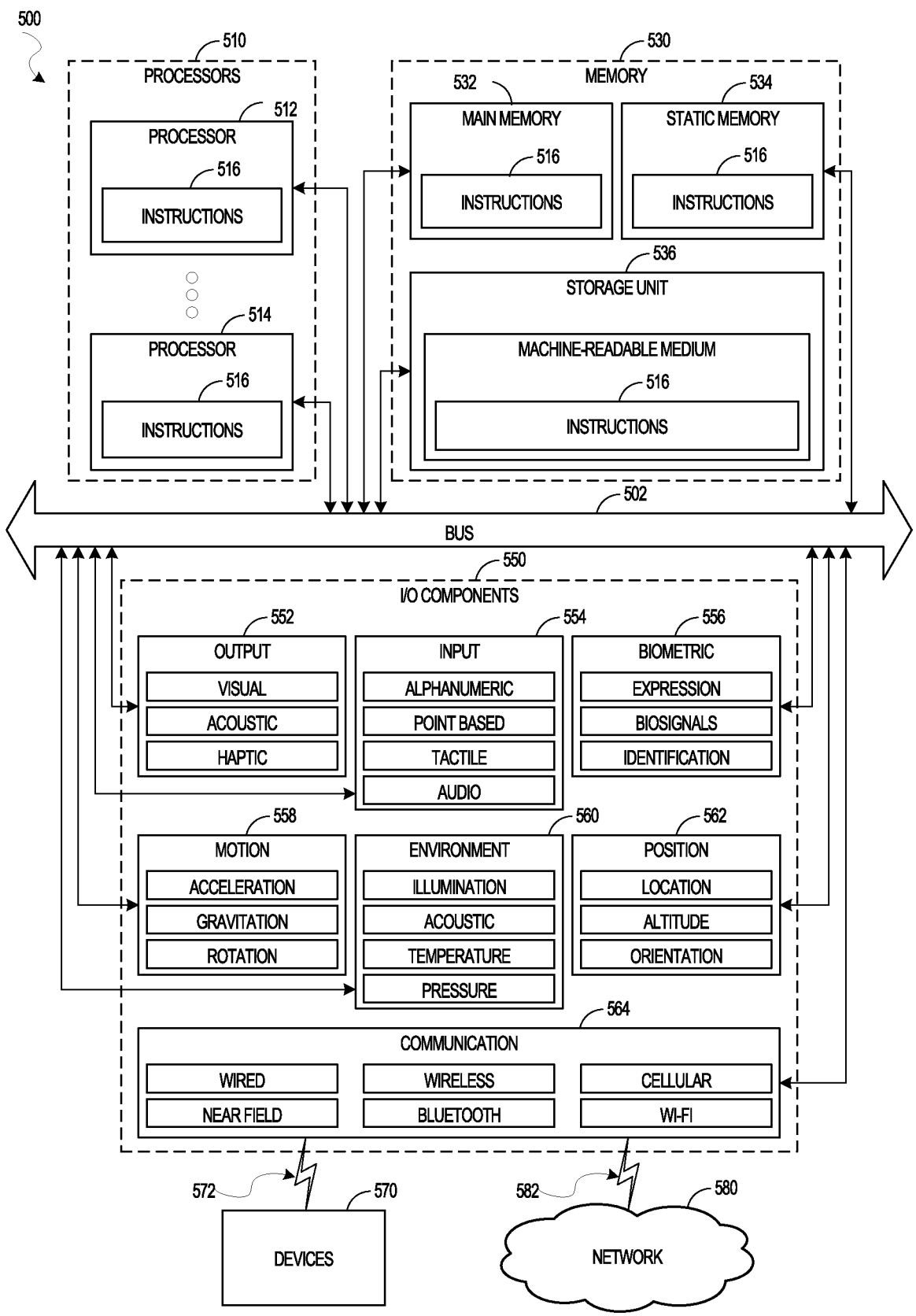
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement the systems described in FIGS. 1-2 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
    at least one hardware processor; and
    a computer-readable medium storing instructions that, when executed by the at least one hardware processor, cause the at least one hardware processor to perform operations comprising:
        accessing, by a first software assistant, a set of one or more penetration test (pentest) notes, the pentest notes including one or more guidelines for performing penetration testing;
        accessing, by the first software assistant, contextual information regarding a target of the penetration testing;
        feeding, by the first software assistant, the set of one or more pentest notes and the contextual information to a Large Language Model (LLM);
        receiving, from the LLM, a generated testing scenario, the generated testing scenario including a sequence of steps to be performed to perform the penetration testing on the target;
        executing the sequence of steps, producing one or more results;
        feeding, by the first software assistant, the one or more results to the LLM;
        receiving, from the LLM, a generated report;
        updating the pentest notes based on the generated report; and
        feeding the updated pentest notes into the LLM to retrain the LLM to improve future generation of testing scenario.

2. The system of claim 1, wherein the operations further comprise:
    receiving human feedback regarding the generated testing scenario; and
    feeding the set of one or more pentest notes, the contextual information, and the human feedback to the LLM to generate an updated version of the generated testing scenario.

3. The system of claim 1, wherein the operations further comprise:
    determining whether to execute the sequence of steps one at a time allowing for manual feedback at each step; and
    in response to a determination to execute the sequence of steps one at a time allowing for manual feedback at each step, executing a first step of the sequence of steps, receiving individual feedback on execution of the first step, and feeding, by the first software assistant, the set of one or more pentest notes, the contextual information, and the individual feedback to the LLM to regenerate the generated testing scenario.

4. The system of claim 1, wherein the LLM is a localized fine-tuned LLM layer of an external LLM.

5. The system of claim 4, wherein the localized fine-tuned LLM layer is trained independently of the external LLM.

6. The system of claim 1, wherein the contextual information includes name of a software component to be tested.

7. The system of claim 1, wherein the contextual information includes language of a software component to be tested.

8. A method comprising:
    accessing, by a first software assistant, a set of one or more penetration test (pentest) notes, the pentest notes including one or more guidelines for performing penetration testing;
    accessing, by the first software assistant, contextual information regarding a target of the penetration testing;
    feeding, by the first software assistant, the set of one or more pentest notes and the contextual information to a Large Language Model (LLM);
    receiving, from the LLM, a generated testing scenario, the generated testing scenario including a sequence of steps to be performed to perform the penetration testing on the target;

executing the sequence of steps, producing one or more results;
feeding, by the first software assistant, the one or more results to the LLM;
receiving, from the LLM, a generated report;
updating the pentest notes based on the generated report; and
feeding the updated pentest notes into the LLM to retrain the LLM to improve future generation of testing scenario.

9. The method of claim 8, further comprising:
receiving human feedback regarding the generated testing scenario; and
feeding the set of one or more pentest notes, the contextual information, and the human feedback to the LLM to generate an updated version of the generated testing scenario.

10. The method of claim 8, further comprising:
determining whether to execute the sequence of steps one at a time allowing for manual feedback at each step; and
in response to a determination to execute the sequence of steps one at a time allowing for manual feedback at each step, executing a first step of the sequence of steps, receiving individual feedback on execution of the first step, and feeding, by the first software assistant, the set of one or more pentest notes, the contextual information, and the individual feedback to the LLM to regenerate the generated testing scenario.

11. The method of claim 8, wherein the LLM is a localized fine-tuned LLM layer of an external LLM.

12. The method of claim 11, wherein the localized fine-tuned LLM layer is trained independently of the external LLM.

13. The method of claim 8, wherein the contextual information includes name of a software component to be tested.

14. The method of claim 8, wherein the contextual information includes language of a software component to be tested.

15. A non-transitory machine-readable medium storing instructions which, when executed by one or more processors, cause the one or more processors to perform operations comprising:
accessing, by a first software assistant, a set of one or more penetration test (pentest) notes, the pentest notes including one or more guidelines for performing penetration testing;
accessing, by the first software assistant, contextual information regarding a target of the penetration testing;
feeding, by the first software assistant, the set of one or more pentest notes and the contextual information to a Large Language Model (LLM);
receiving, from the LLM, a generated testing scenario, the generated testing scenario including a sequence of steps to be performed to perform the penetration testing on the target;
executing the sequence of steps, producing one or more results;
feeding, by the first software assistant, the one or more results to the LLM;
receiving, from the LLM, a generated report;
updating the pentest notes based on the generated report; and
feeding the updated pentest notes into the LLM to retrain the LLM to improve future generation of testing scenario.

16. The non-transitory machine-readable medium of claim 15, wherein the operations further comprise:
receiving human feedback regarding the generated testing scenario; and
feeding the set of one or more pentest notes, the contextual information, and the human feedback to the LLM to generate an updated version of the generated testing scenario.

17. The non-transitory machine-readable medium of claim 15, wherein the operations further comprise:
determining whether to execute the sequence of steps one at a time allowing for manual feedback at each step; and
in response to a determination to execute the sequence of steps one at a time allowing for manual feedback at each step, executing a first step of the sequence of steps, receiving individual feedback on execution of the first step, and feeding, by the first software assistant, the set of one or more pentest notes, the contextual information, and the individual feedback to the LLM to regenerate the generated testing scenario.

18. The non-transitory machine-readable medium of claim 15, wherein the LLM is a localized fine-tuned LLM layer of an external LLM.

19. The non-transitory machine-readable medium of claim 18, wherein the localized fine-tuned LLM layer is trained independently of the external LLM.

20. The non-transitory machine-readable medium of claim 15, wherein the contextual information includes name of a software component to be tested.

* * * * *